United States Patent
Gregotski et al.

(10) Patent No.: US 9,794,562 B2
(45) Date of Patent: Oct. 17, 2017

(54) GENERATION AND DETECTION OF PRIVATE METADATA IN AN ENCODED VIDEO TRANSPORT STREAM

(75) Inventors: Mark E. Gregotski, Jamison, PA (US); Thomas L. Du Breuil, Ivyland, PA (US); Fabrice M. Quinard, Los Gatos, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 553 days.

(21) Appl. No.: 12/631,380

(22) Filed: Dec. 4, 2009

(65) Prior Publication Data

US 2011/0134991 A1   Jun. 9, 2011

(51) Int. Cl.
| | |
|---|---|
| *H04N 19/70* | (2014.01) |
| *H04N 19/48* | (2014.01) |
| *H04N 19/40* | (2014.01) |
| *H04N 19/124* | (2014.01) |
| *H04N 21/647* | (2011.01) |
| *H04N 19/176* | (2014.01) |

(52) U.S. Cl.
CPC ......... *H04N 19/124* (2014.11); *H04N 19/176* (2014.11); *H04N 19/40* (2014.11); *H04N 19/48* (2014.11); *H04N 19/70* (2014.11); *H04N 21/64715* (2013.01); *H04N 21/64738* (2013.01)

(58) Field of Classification Search
None
See application file for complete search history.

(56) References Cited

U.S. PATENT DOCUMENTS

| | | | |
|---|---|---|---|
| 6,219,358 B1 * | 4/2001 | Pinder et al. | 370/537 |
| 6,418,122 B1 | 7/2002 | Schoenblum et al. | |
| 6,567,128 B1 * | 5/2003 | Webb et al. | 348/584 |
| 6,731,685 B1 | 5/2004 | Liu et al. | |
| 7,009,997 B2 | 3/2006 | Huang et al. | |
| 7,096,481 B1 * | 8/2006 | Forecast et al. | 725/32 |
| 7,274,739 B2 | 9/2007 | Wu et al. | |
| 7,802,286 B2 | 9/2010 | Brooks et al. | |
| 2001/0022789 A1 | 9/2001 | Huang et al. | |
| 2001/0033619 A1 * | 10/2001 | Hanamura et al. | 375/240.26 |
| 2002/0087975 A1 | 7/2002 | Schlack | |
| 2002/0097728 A1 | 7/2002 | Hinderks et al. | |
| 2002/0129368 A1 | 9/2002 | Schlack | |
| 2003/0169368 A1 | 9/2003 | Hamada et al. | |
| 2003/0182184 A1 | 9/2003 | Strasnick et al. | |
| 2004/0028228 A1 | 2/2004 | Hamada et al. | |

(Continued)

OTHER PUBLICATIONS

Advanced Television Systems Committee, "Technology Group Report: ATSC Usage of the MPEG-2 Registration Descriptor", pp. 1-5, Oct. 9, 2001.

(Continued)

*Primary Examiner* — Mikhail Itskovich
(74) *Attorney, Agent, or Firm* — Lori Anne D. Swanson

(57) ABSTRACT

A method of processing a video transport stream includes receiving a video transport stream and identifying at least one portion of the video transport stream that is not to undergo modification when processed by a rate shaping device. An indicator is inserted into the video transport stream. The indicator is used to signal the statistical multiplexer that the at least one portion of the video transport stream is not to be modified when the video transport stream is processed by the rate shaping device.

24 Claims, 8 Drawing Sheets

(56) References Cited

U.S. PATENT DOCUMENTS

| | | |
|---|---|---|
| 2005/0039213 A1 | 2/2005 | Matarese et al. |
| 2005/0278743 A1 | 12/2005 | Flickinger et al. |
| 2006/0171390 A1 | 8/2006 | La Joie |
| 2006/0190964 A1 | 8/2006 | Eldering |
| 2006/0209709 A1 | 9/2006 | Kovacevic |
| 2007/0022459 A1 | 1/2007 | Gaebel, Jr. et al. |
| 2007/0217436 A1 | 9/2007 | Markley et al. |
| 2008/0187040 A1 | 8/2008 | Yu et al. |
| 2008/0229379 A1 | 9/2008 | Akhter |
| 2009/0041115 A1 | 2/2009 | Ramesh et al. |
| 2009/0055871 A1 | 2/2009 | Song et al. |
| 2009/0150926 A1 | 6/2009 | Schlack |

OTHER PUBLICATIONS

PCT International Search Report, Re: PCT Application #PCT/US2008/084128, dated Nov. 20, 2008.

\* cited by examiner

TRANSPORT STREAM PACKET LAYER FORMAT

| SYNTAX | NUMBER OF BITS | MNEMONIC |
|---|---|---|
| transport_packet() { <br>   sync_byte <br>   transport_error_indicator <br>   payload_unit_start_indicator <br>   transport_priority <br>   PID <br>   transport_scrambling_control <br>   adaptation_field_control <br>   continuity_counter <br>   if(adaptation_field_control == '10' \|\| adaptation_field_control == '11') { <br>     adaptation_field() <br>   } <br>   if(adaptation_field_control == '01' \|\| adaptation_field_control == '11') { <br>     for (i = 0; i < N; i++) { <br>       data_byte <br>     } <br>   } <br> } | <br> 8 <br> 1 <br> 1 <br> 1 <br> 13 <br> 2 <br> 2 <br> 4 <br><br><br><br><br><br> 8 | <br> bslbf <br> bslbf <br> bslbf <br> bslbf <br> uimsbf <br> bslbf <br> bslbf <br> uimsbf <br><br><br><br><br><br> bslbf |

FIG. 2

| DATA STRUCTURE | BIT | IDENTIFIER *1 |
|---|---|---|
| program_map_section () {<br>    table_id<br>    section_syntax_indicator<br>    '0'<br>    reserved<br>    section_length<br>    program_number<br>    reserved<br>    version_number<br>    current_next_indicator<br>    section_number<br>    last_section_number<br>    reserved<br>    PCR_PID<br>    reserved<br>    program_info_length<br>    for (i = 0; i < N; i++) {<br>        descriptor ()<br>    }<br>    for (i = 0; i < N; i++) {<br>        stream_type<br>        reserved<br>        elementary_PID<br>        reserved<br>        ES_info_length<br>        for (j = 0; j < M; j++) {<br>            descriptor ()<br>        }<br>    }<br>    CRC_32<br>} | <br>8<br>1<br>1<br>2<br>12<br>16<br>2<br>5<br>1<br>8<br>8<br>3<br>13<br>4<br>12<br><br><br><br><br><br>8<br>3<br>13<br>4<br>12<br><br><br><br><br>32 | <br>uimsbf<br>bslbf<br>bslbf<br>bslbf<br>uimsbf<br>uimsbf<br>bslbf<br>uimsbf<br>bslbf<br>uimsbf<br>uimsbf<br>bslbf<br>uimsbf<br>bslbf<br>uimsbf<br><br><br><br><br><br>uimsbf<br>bslbf<br>uimsbf<br>bslbf<br>uimsbf<br><br><br><br><br>rpchof |

*1    bslbf      : bit string, left bit first
       uimsbf    : unsigned integer, most significant bit first
       rpchof    : remainder polynomial coefficients, highest order first

*FIG. 4*

REGISTRATION DESCRIPTOR

| SYNTAX | NUMBER OF BITS |
|---|---|
| registration_descriptor () { | |
|     descriptor_tag | 8 |
|     descriptor_length | 8 |
|     format_identifier | 32 |
|     for (i = 0; i < N; i++) { | |
|         additional_identification_info | 8 |
|     } | |
| } | |

*FIG. 5*

GENERATION AND DETECTION OF PRIVATE METADATA IN AN ENCODED VIDEO TRANSPORT STREAM

FIELD OF THE INVENTION

The present invention relates generally to the transmission and receipt of digital transport streams and more particularly to the transmission and receipt of an encoded video transport stream that includes information specifying that selected portions of the transport stream are to remain unmodified when received by a device, such as a statistical re-multiplexer or other rate shaping device.

BACKGROUND OF THE INVENTION

With recent advances in digital data transmission techniques and digital video compression, such as used in the MPEG-2 standard, it is possible to deliver several digitally compressed video programs in the same bandwidth presently occupied by a single analog television (TV) channel. These capabilities provide opportunities for programming service providers (e.g., broadcasters such as CNN, ABC), network operators (e.g., cable and satellite network owners), and end users.

In a multi-program transmission environment, several programs (e.g., channels) are coded, multiplexed and transmitted over a single communication channel. Since these programs share a limited channel capacity, the aggregate bit rate of the programs must be no greater than the communication channel rate. Accordingly, many video encoding applications utilize statistical remultiplexing techniques to combine several programs each comprising a compressed video bit stream into a single multiplexed bit stream, e.g., for transmission on a single channel. The bit rate of a given compressed stream generally varies with time based on the complexity of the corresponding video signals. A statistical re-multiplexer attempts to estimate the complexity of the various video frame sequences of a video signal and allocates channel bits among the corresponding compressed video bit streams so as to provide an approximately constant level of video quality across all of the multiplexed streams. For example, a given video frame sequence with a relatively large amount of spatial activity or motion may be more complex than other sequences and therefore allocated more bits than the other sequences.

A statistical re-multiplexer is one example of a rate shaping device that re-encodes individual encoded programs in such a way that the re-encoded programs or services do not collectively exceed the channel capacity bit rate. In a statistical remultiplexing system the bit rate of a multiplexed stream that includes multiple encoded video programs are adjusted so that the total bandwidth needed to transmit the multiplexed stream is maintained at a given level. A different bit rate may be assigned to each individual encoded program depending on a respective estimate of the number of bits needed by the video bit stream of the corresponding program to achieve the same level of quality as the other programs with which it is multiplexed. Accordingly, the methods employed to change the bit rate of the video stream are typically lossy and result in the modification of the originally encoded video data due to decoding and re-encoding operations.

FIG. 1 shows a conventional rate shaping device that is used to perform statistical remultiplexing. The rate shaping device 10 includes inverse variable length coding (VLC) module 30, inverse quantizer 40, forward quantizer 50 and forward VLC 70. In operation, the Inverse VLC 30 receives an encoded video stream such as an MPEG-2 video stream and applies inverse entropy coding such as inverse Huffman coding, for example, to the encoded video stream. The inverse VLC 30 performs variable length decoding, thereby separating the coded data into the motion vector, predictive mode, quantization step, and quantized coefficients at a macroblock level. The inverse quantizer 40 applies inverse quantization to decompress the macroblock coefficients such as discrete cosine transport (DCT) coefficients which are received from the inverse VLC 30. The forward quantizer 50 receives the uncompressed macroblock coefficients from the inverse quantizer 40 and applies a new quantization to the coefficients as specified by the new quantization level that is desired. This quantization process is not lossless and alters the original input video stream. The forward VLC 70 receives the requantized macroblock coefficients from the forward quantizer 50 and applies entropy coding (e.g., Huffman coding) to the video streams and outputs the final remultiplexed video stream.

Because statistical remultiplexing techniques are generally lossy, it may sometimes be desirable to preserve certain portions of a video stream that is to undergo statistical remultiplexing so that they are not altered by the statistical remultiplexer.

SUMMARY

In accordance with one aspect of the invention, a method of processing a video transport stream is provided. The method includes receiving a video transport stream and identifying at least one portion of the video transport stream that is not to undergo modification when processed by a rate shaping device. An indicator is inserted into the video transport stream. The indicator is used to signal the statistical multiplexer that the at least one portion of the video transport stream is not to be modified when the video transport stream is processed by the rate shaping device.

In accordance with another aspect of the invention, a rate shaping device is provided which includes a metadata extractor for extracting predefined metadata from a video transport stream. The predefined metadata specifies at least one portion of the video transport stream that is not to be re-encoded. The rate shaping device also includes a re-encoder arrangement, responsive to receipt of a signal from the metadata extractor, for re-encoding at a bit rate different from its original bit rate a remaining portion of the video transport stream that excludes the at least one portion of the video transport stream that is not be re-encoded.

In accordance with yet another aspect of the invention, a video transmitter is provided which includes an A/V codec for receiving video programming and generating a digital video stream. The video transmitter also includes a PSI module configured to receive private metadata associated with the video programming, generate at least one PSI table and insert a descriptor in the PSI table indicating the presence of the private metadata. A metadata insertion module is configured to receive the digital video stream and the private metadata and insert the private metadata into a prescribed portion of the digital video stream specifying a portion of the digital video stream that is not to be modified by a rate shaping device.

BRIEF DESCRIPTION OF THE DRAWINGS

FIG. 2 is the MPEG-2 transport stream packet format syntax in accordance with the MPEG-2 standard.

FIG. 4 shows the PMT format syntax in accordance with the MPEG-2 standard.

FIG. 5 shows the syntax for the registration descriptor in accordance with the MPEG-2 standard.

DETAILED DESCRIPTION

Figure 1:
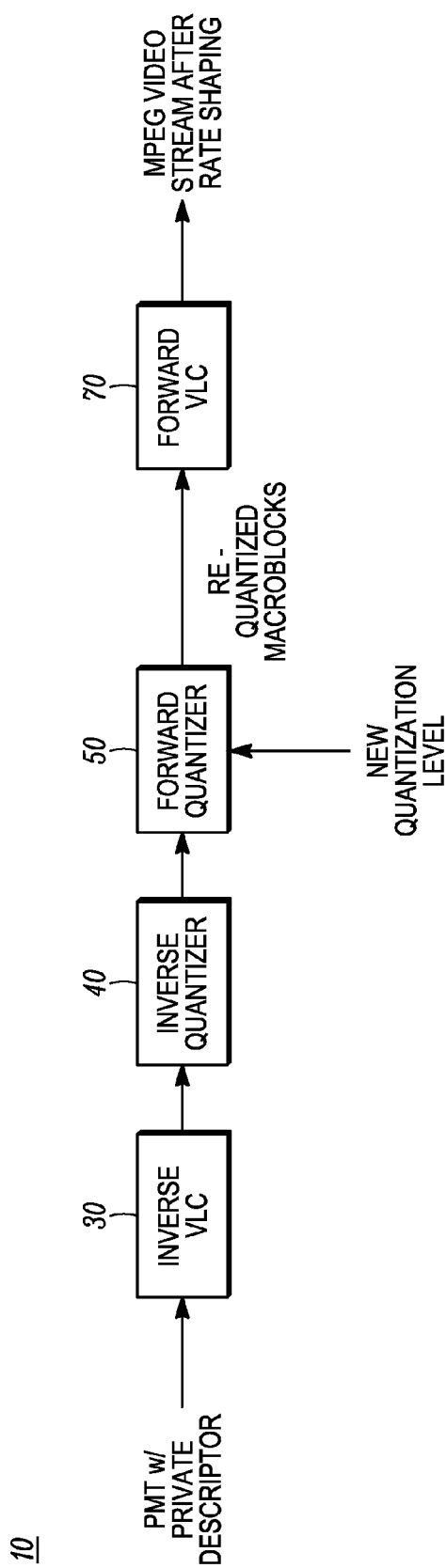
FIG. 1 shows a conventional rate shaping device that is used to perform statistical remultiplexing.

As detailed below, an encoded video stream such as an MPEG stream supports the carriage of metadata that can be used to instruct a downstream device such as a decoder (e.g., a statistical multiplexer or other rate shaping device) to allow specified segments of the video to pass through the decoder without modification. The encoded video stream may be arranged in accordance with an MPEG media format, such as the MPEG-2 media format, but alternatively may be arranged in accordance with other media formats, including but not limited to other MPEG formats, Hypertext Markup Language (HTML), Virtual Hypertext Markup Language (VHTML), X markup language (XML), H.261, H.263, H.264, or VC1 formats. A video stream that conforms to the MPEG-2 standard will be used herein for illustrative purposes only and not as a limitation on the invention.

For a variety of reasons there may be certain segments of a video stream that are deemed significant or important in some way and thus are to be preserved without undergoing modification during the rate shaping process. The segment that is to be preserved may be of any size. For instance, the segment may be a frame or a subset thereof, a group of pictures, a scene, or an entire program or event. These segments may be selected based on a variety of desired criteria. For instance, it may be desirable to preserve high quality video levels for segments that contain images that are to be highly scrutinized such as a segment showing a football in play during a football game or a segment that contains an image of certain individuals or objects of particularly high interest. Similarly, video replay segments of a sporting event may be automatically selected to contain metadata indicating that the video segment is not to be modified. In another example, some video segments may contain a video marker that is used for a variety of purposes such as digital watermarking, for example. During the rate shaping process these markers may be modified or removed, thereby rendering the marker unrecognizable or inaccessible to a downstream device.

The information indicating that portions of an encoded video stream are not to be modified may be incorporated into the encoded video stream as private metadata at the transport stream level, the video picture level, or the video sequence level (i.e., the level at which images such as I, B and P pictures are defined). The private metadata may be embodied in any appropriate data structure that may in part depend on the level at which the information is embedded.

The preservation of small portions of an image, such as macroblocks, may be performed by specifying in the metadata a range of transport packets that should not be modified. To preserve an entire picture, such as an encoded I, B, and P picture, user data relating to the desired picture may be used to specify that the picture should not be modified. To preserve a sequence of coded pictures that may constitute a scene, user data related to a video sequence may be used to specify the scene that should not be modified. Similarly, for H.264/AVC encoded video, a coded video sequence that is to be preserved may begin with an instantaneous decoding refresh (IDR) access unit. Moreover, the particular information included in the private metadata may be different in different implementations. For instance, the information may specify the number of packets following the packet in which the metadata is located which should not be modified. Alternatively, start and stop markers may be employed, indicating that the packets between the markers should not be modified. In some implementations a flag or other indicator may be used to signal the presence of metadata specifying the packets that are to remain unmodified. In some cases, as illustrated in the example presented below, the flag and the metadata may be located in one part of the transport stream while a descriptor that describes the structure of the metadata may be included in another part of the transport stream.

An example is presented illustrating how the private metadata may be incorporated at the transport level in a MPEG-2 transport stream. In this example, the flag and metadata are located in the adaptation field of the transport packets and the descriptor is located in the program map table (PMT).

The MPEG-2 standard provides for a packet based encoding and transport of multimedia data, wherein video, audio and other data are multiplexed into a bit stream. The bit stream is then segmented into a packetized elementary stream (PES), and then respective packets are multiplexed into a transport stream (TS). A transport stream consists of packets of fixed length (188 bytes). The PES is a data structure used to carry elementary stream data. An elementary stream (ES) is either one of coded video, coded audio, or other coded data streams associated with a single program and carried in a sequence of PES packets with only one packet identifier (PID). That is, the packets that make up an elementary stream can be recognized by their Packet Identifier (PID) value.

Figure 3:
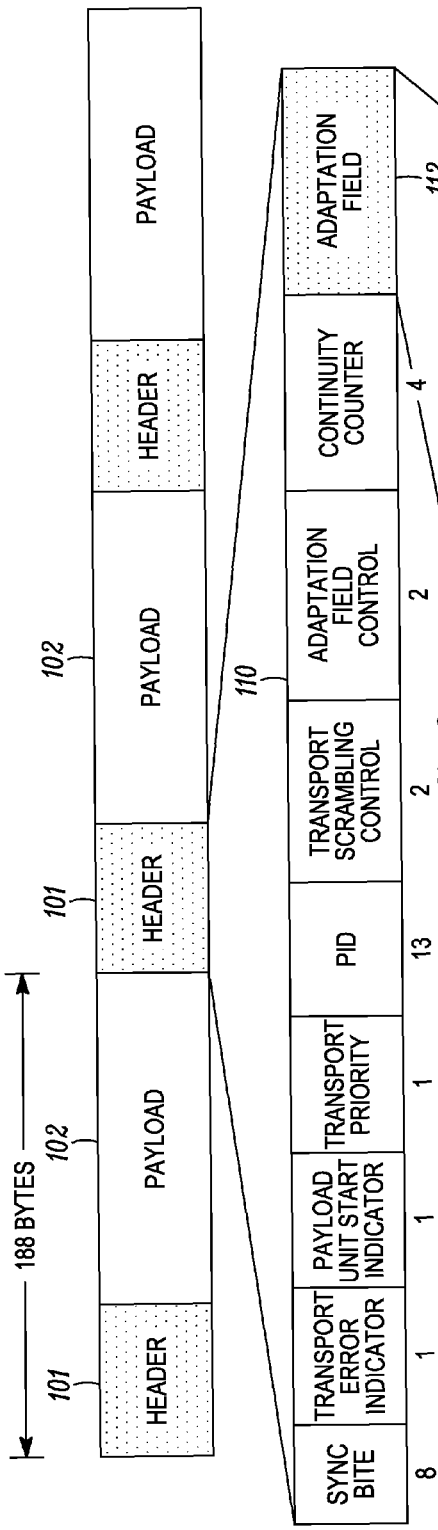
FIG. 3 illustrates one example of a transport stream packet that includes a header, optional adaptation field and payload.

In addition to the video, audio and data elementary streams, a single program transport stream also includes program specific information (PSI) associated with the elementary streams such as system tables, which in the case of MPEG, for example, includes the program association table (PAT), the program map table (PMT) and possibly other tables such a conditional access table (CAT). The PMT describes the elementary streams (e.g., video, audio and data streams) that comprise the program being transported. The PMT specifies the packet identifiers (PIDs) for each elementary stream. For instance, a video program will generally include a video PID and an audio PID as well as certain other PIDs such as a Program Clock reference (PCR) PID and possibly an Entitlement Control Message (ECM) PID. The PAT describes the number of programs in a transport packet stream and provides the PID of the PMT for each program. Consequently, each transport stream contains one PAT and one or more PMTs (one for each program). FIG. 2 is the MPEG-2 transport stream packet format syntax in accordance with the MPEG-2 standard. FIG. 3 illustrates a transport stream packet 100 of 188 bytes, each packet including a header 101 and a payload 102. As further shown in FIG. 3, each header 101 includes an eight (8) bit sync byte field, a one (1) bit transport error indicator field, a one (1) bit payload unit start indicator field, a one (1) bit transport priority field, a thirteen (13) bit packet identifier field, a two (2) bit transport scrambling control field 110, a two (2) bit adaptation field control field and a four (4) bit continuity counter field. Each of these fields is described in the MPEG-2 standard.

The sync byte identifies the start of a transport stream (TS) packet. The payload unit start indicator (USI) field indicates whether the TS packet carries the start of a new payload USI="1") or the TS packet does not carry the start of a new payload (USI="0"). The packet identifier (PID) field provides a means to identify packets corresponding to an elementary stream. Certain PID values are reserved. The continuity counter (CC) field counts the number of consecutive TS packets having the same PID field value. The PID field is used not only to distinguish separate elementary streams, but also separate Program Specific Information (PSI) tables such as the aforementioned Program Association Table (PAT), and the Program Map Table (PMT). The PAT table lists unique program numbers as identifiers for each program in a multiplex, and the PMT PID number associated with each program number. A fixed PID number of 0x0000 is assigned to the PAT, making it possible for the system to download the PAT table on startup by retrieving PID 0x0000 packets. Each program identified the PAT table has a related Program Map Table (PMT) having its own unique PID identifier. Each PMT lists the PIDs for all Elementary Streams (components) comprising a given program associated with the PMT.

In one implementation, a descriptor may be placed in the PMT indicating that private metadata is included in the transport stream. The descriptor functions to describe the data structure of the private metadata to a decoder such as a rate shaping device that is to read the private metadata. The metadata itself may be located elsewhere in the transport stream. For example, the metadata may be placed in the optional adaptation field of a transport stream packet. When the descriptor and the metadata are not co-located, the descriptor included the PMT may also specify the location (e.g., the adaptation field) at which the metadata may be found.

FIG. 4 shows the PMT format syntax in accordance with the MPEG-2 standard. The PMT is composed of two portions, a first portion that includes information describing the program and a second portion which describes the type of each element in the program and each PID. As shown, the first portion of the PMT includes a table ID (table_id) of eight bits, a section syntax indicator (section_syntax_indicator) of one bit, a reserve (reserved) of two bits, a section length of 12 bits, a program number (program_number) of 16 bits, a reserve (reserved) of two bits, a version number (version_number) of five bits, a current/next indicator (current_next_indicator) of eight bits, a section number (section_number) of eight bits, a last section number (last_section number) of eight bits, a reserve (reserved) of three bits, a PCR-PID (PCR PID) of 13 bits, a reserve (reserved) of four bits, and a program length (program_info_length) of 12 bits. This information describes the program. For instance, the program number (program_number) typically corresponds to the channel on which the program is broadcast. Following the program length is a program descriptor.

The next portion of the PMT is looped and is often referred to as the elementary stream (ES) loop. Each loop represents an elementary stream included in the channel. The ES loop includes a stream type (stream_type) of eight bits, a reserve (reserved) of three bits, an elementary PID (elementary_PID) of 13 bits, a reserve (reserved) of four bits, and an ES information length (ES_info_length) of 12 bits. The ES information length describes the length of the ES Descriptor that follows.

One type of ES Descriptor that may be employed in the ES loop is a registration descriptor (registration_descriptor) for the video component. MPEG recognizes that private data may sometimes need to be incorporated into a transport stream compliant with MPEG. To accommodate such private data, the MPEG registration descriptor is used to provide a decoder with an understanding (i.e., syntax and semantics) of the data structures (e.g., tables or stream types) that are outside of those defined in MPEG.

FIG. 5 shows the syntax for the registration descriptor in accordance with the MPEG-2 standard. The fields of the registration descriptor include descriptor start (registration_descriptor), a descriptor tag (descriptor_tag) to identify the descriptor as a registration descriptor (set to 0x05), a descriptor length (descriptor_length), which gives the number of bytes following the descriptor length field itself to the end of descriptor, a format identifier (format_identifier) to identify an entity that has ideally registered with a Registration Authority and which is sanctioned by ISO/IEC for MPEG specifications. The field I=0–N represents optional extra data bytes, where the value of N is given by the descriptor_length field. Finally, an additional field (additional_identification_info) provides the optional data defined by the entity represented by the format_identifier value.

The private metadata descriptor that describes the structure of the private metadata in the adaptation field may be placed in the program descriptor of the PMT, or, alternatively, in the descriptor of the video ES loop in the PMT. For instance, in some implementations a format_indicator may be defined by a value known a priori to signal a stream carrying metadata. The additional_identification_info bytes may contain a signature that a device would look for in the private metadata to verify the intent of the information, and an identifier indicating the location of the private metadata (e.g., transport stream, PES, picture). An example Registration Descriptor:

```
{
    descriptor_tag == 0x05
    descriptor_length == 0x09
    format_identifier == 0x4D4F5431 (MOT1)
        signature_byte1
        signature_byte2
        signature_byte3
        signature_byte4
        location_code.
}
```

Referring again to FIG. 3, the header 102 of a transport stream packet optionally may include an adaptation field 112.

Figure 6:
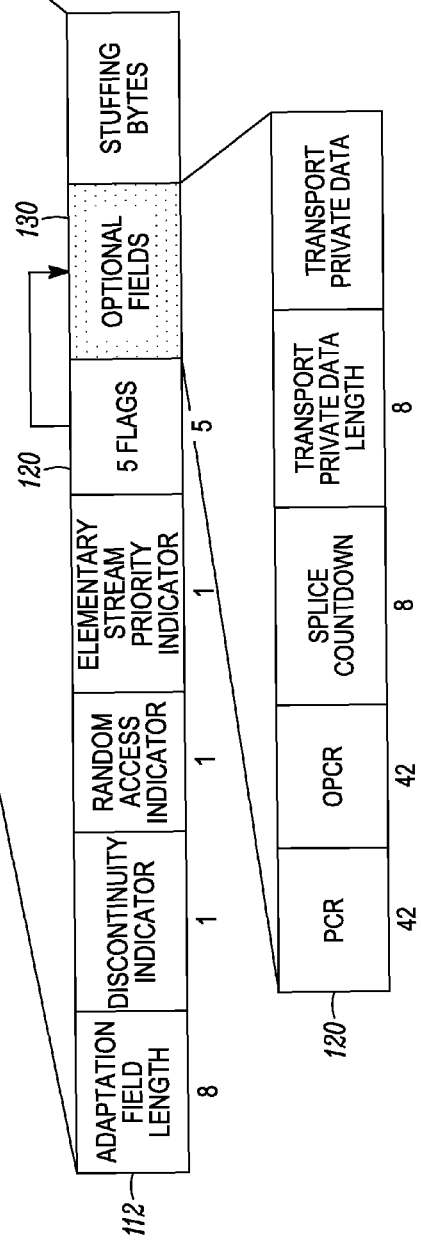
FIG. 6 shows the format of the adaptation field in a transport packet.

FIG. 6 shows the format of the adaptation field 112 in the transport packet. The adaptation field may include an adaptation field length, a discontinuity indicator, a random access indicator, an elementary stream priority indicator, five flags 120, optional fields 130, and stuffing bytes. The five flags 120 indicate which of the optional fields are provided in the adaptation field, and, as also shown in FIG. 6, include a Program Clock Reference (PCR) flag, an Original Program Clock Reference (OPCR) flag, a Splicing Point flag, a Transport Private Data flag, and an Adaptation Field Extension flag. The optional fields 130 are selectively generated when corresponding ones of the five flags are set to "1," rather than being provided all the time. If none of the five flags 120 are set to "1", then none of the optional fields 130 are generated. For instance, a private data field is generated within the adaptation field 112 when the transport private data flag of the five flags 120 is set to "1". The private data field may then be filled with the desired private data.

In some implementations the private metadata specifying which packets should remain unmodified by a decoder may be included in the optional field of the adaptation field when the transport private data flag is set to "1". In one particular implementation the private metadata may consist of 6 bytes of information. The first four bytes may serve as a signature or identifier that the data is indeed part of the correct private data stream serving as video metadata. This signature may match information placed in the registration descriptor of the accompanying PMT. The last two bytes represent the number of packets in the associated video elementary stream, following the private data packet, that are not to be modified by the statistical multiplexer or other rate-shaping device. One example of the syntax for the 6 byte private metadata is as follows:

Transport_private_data_length == 6
Private_data_byte(1) = signature_byte1
Private_data_byte(2) = signature_byte2
Private_data_byte(3) = signature_byte3
Private_data_byte(4) = signature_byte4
Private_data_byte(5) = length_byte1 (msb)
Private_data_byte(6) = length_byte2 (lsb)

Figure 7:
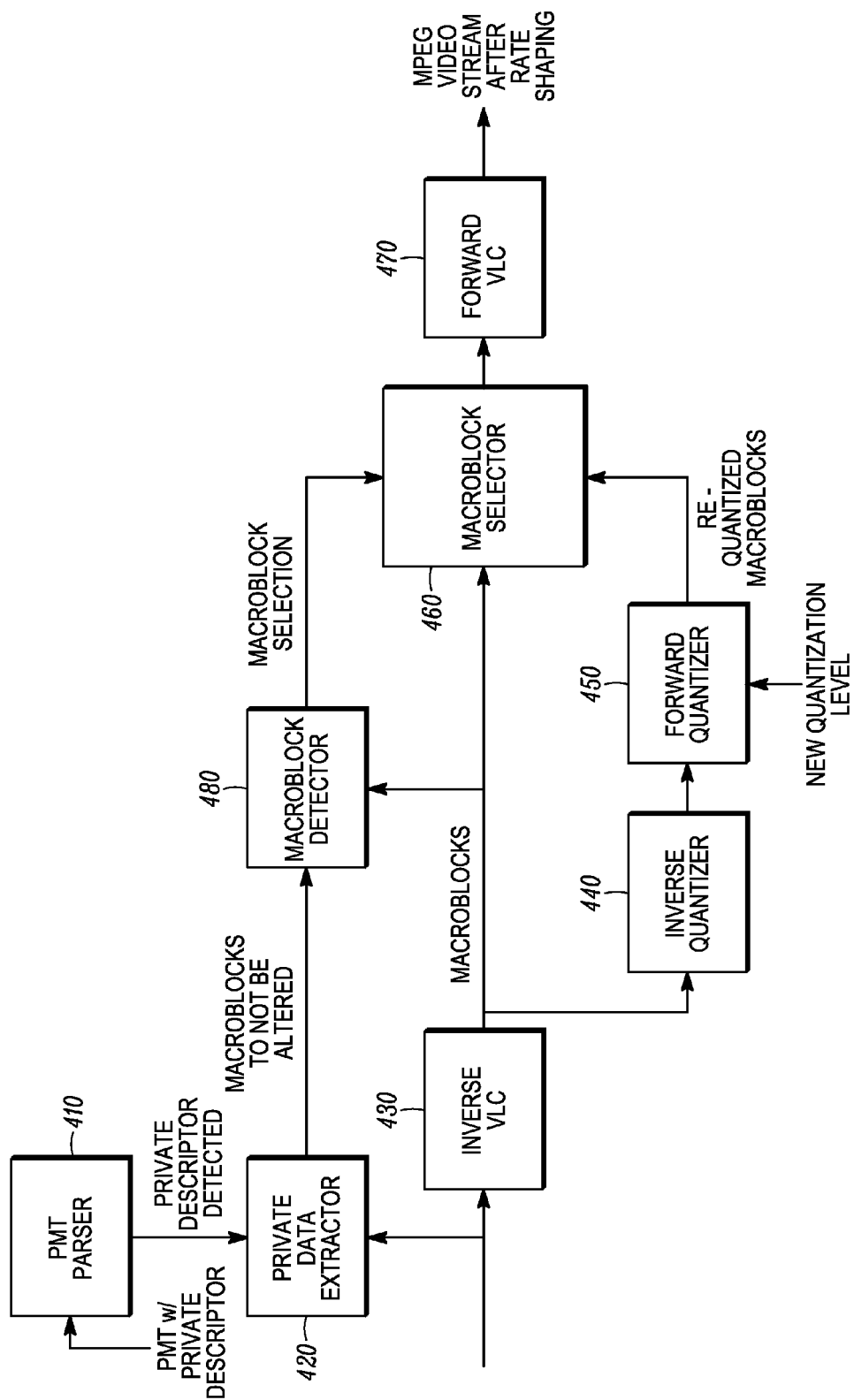
FIG. 7 shows one example of a rate shaping device that can identify private metadata embedded in a video transport stream that instructs the rate shaping device to leave selected portions of the video transport stream unmodified.

FIG. 7 shows one example of a downstream device that can identify private metadata embedded in a video transport stream that instructs the downstream device to leave selected portions of the video transport stream unmodified. In this example the downstream device is a rate shaping device 400. The rate shape shaping device 400 includes a PMT parser 410 (which is typically part of a PSI handler), private data extractor 420, macroblock detector 480, inverse VLC 430, macroblock selector 460, inverse quantizer 440 and forward quantizer 450. The PMT parser 410 receives the input program PMT, which has been obtained by the PSI handler from the PAT, and extracts descriptor information indicating the presence or absence of the private metadata. When the private metadata is present, the private descriptor information indicates where the private metadata is embedded in the video stream. For instance, as previously noted, the private metadata may be located in either: a) the transport packet adaptation field, b) PES private data, or c) private picture data. The private data extractor 420 receives the private descriptor from the PMT parser 410 as well as the input encoded video stream. The private data extractor 410 parses the private metadata and in response sends a signal to the macroblock detector 480 indicating which macroblocks are not to be altered. The inverse VLC 430 performs variable length decoding, thereby separating the coded data into the motion vector, predictive mode, quantization step, and quantized coefficients at a macroblock level. The macroblock coefficients output by the inverse VLC 430 are directed to the inverse quantizer and the macroblock selector 460. The inverse quantizer 440 applies inverse quantization to decompress the macroblock coefficients, which may be, for example, discrete cosine transport (DCT) coefficients. The forward quantizer 450 receives the uncompressed macroblock coefficients from the inverse quantizer 440 and applies a new quantization to the coefficient as specified by the new quantization level that is desired. As previously mentioned, this quantization process is not lossless and alters any video data on which the process is performed. The macroblock selector 460 receives both the original macroblock from the inverse VLC 430 and the re-quantized macroblock from the forward quantizer 450. The macroblock detector 480 receives the signal from the private data extractor 420 indicating which macroblocks are not to be altered and compares this signal to the current macroblock being processed. The macroblock detector 480, in turn, indicates to the macroblock selector 460 if the original un-altered macroblock from the inverse VLC 430 should be selected, or the altered macroblock from the forward quantizer 450 should be selected. The macroblock selector 460 sends either the altered or un-altered macroblock to the forward VLC 470 as instructed by the macroblock selector 480. The forward VLC 470 receives the macroblocks from the macroblock selector and applies entropy coding (e.g., Huffman coding) to produce the final remultiplexed video stream.

Figure 8:
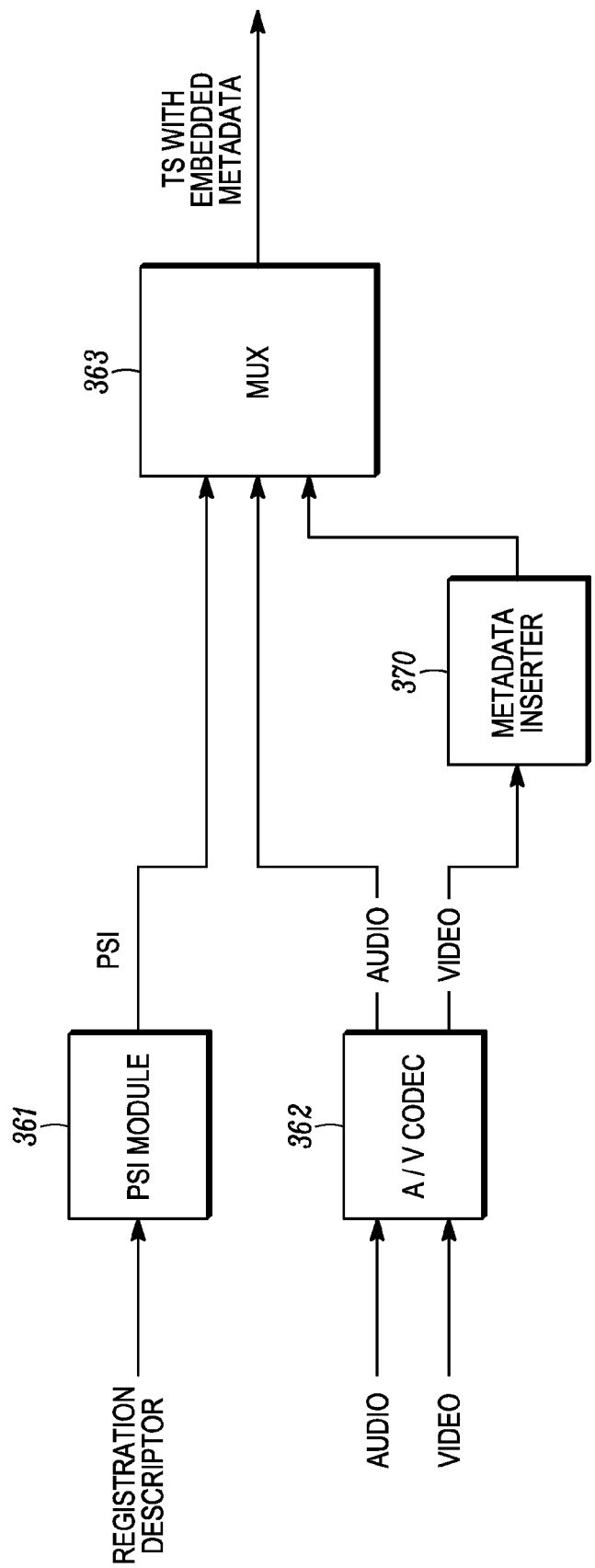
FIG. 8 shows one example of a transmitter that can provide a video transport stream incorporating private metadata described.

FIG. 8 shows one example of a transmitter 300 that can provide a video transport stream incorporating the private metadata described above. The transmission system 300 includes Program Specific Information (PSI) module 361, A/V codec 362, multiplexer 363, and a metadata inserter 370. Information related to the identification of various parts of a program contained in a transport stream is received by the Program Specific Information (PSI) module 361. The audio and video streams associated with the programs placed in the transport stream are received by the A/V codec 362. The combination of the audio and video programming and the PSI modules is used by the multiplexer 363 to generate a conventional video transport stream such as an MPEG-2 transport stream.

In particular, the PSI module 361 generates the PSI tables (e.g., the PAT and PMT) and the A/V codec generates the digital audio and video data from the video programming. The multiplexer 363 acquires the PSI tables from the PSI module 361 and the digital audio and video data from the A/V codec 362 and multiplexes them to provide the video transport stream. Thus, the PSI module 361, A/V codec 362 and multiplexer 363 constitute a video stream generator for generating the video transport stream, which includes both a digital video stream and program specific information. At this point the video transport stream may be provided to an encryptor (not shown) to optionally undergo encryption. The PSI module 361 receives private metadata information that may be placed in a registration descriptor in the PMT that identifies this program or video elementary stream as containing metadata related to the subsequent processing of compressed video (that is, identifying video segments that are not to be modified). In this way the descriptor indicates the presence of the private metadata. An example of a registration descriptor and contents has been previously described.

The metadata inserter 370 receives information concerning the private metadata to be added to the video elementary stream. The metadata inserter, in an example implementation, sets the transport private data flag in the adaptation field of the appropriate packets to "1" and generates a private data field having an appropriate size in the adaptation field of the transport packets and inserts control or signature data into the private data field.

The control or signature bytes are leading bytes in the private data field that serve as a label or signature to indicate the intended use of the private data to a downstream device which is a priori aware of these bytes. The private metadata is written in the private data field portion of the adaptation field in the appropriate video elementary stream packets. The private metadata indicates the data segment that is not to be modified by a downstream device. Finally, the multiplexer 363 is responsible to packetize the PSI, audio stream and video stream containing the private metadata, and create a conventional MPEG transport stream The finalized transport stream output by the multiplexer 363 may be sent over a communication channel of a transmission system to a receiver that can decode the transport stream for subsequent rendering. Prior to transmitting the finalized transport stream over the communication channel, a statistical multiplexer may statistically multiplex the finalized transport stream with other transport streams that are to be transmitted over the communication channel.

Figure 9:
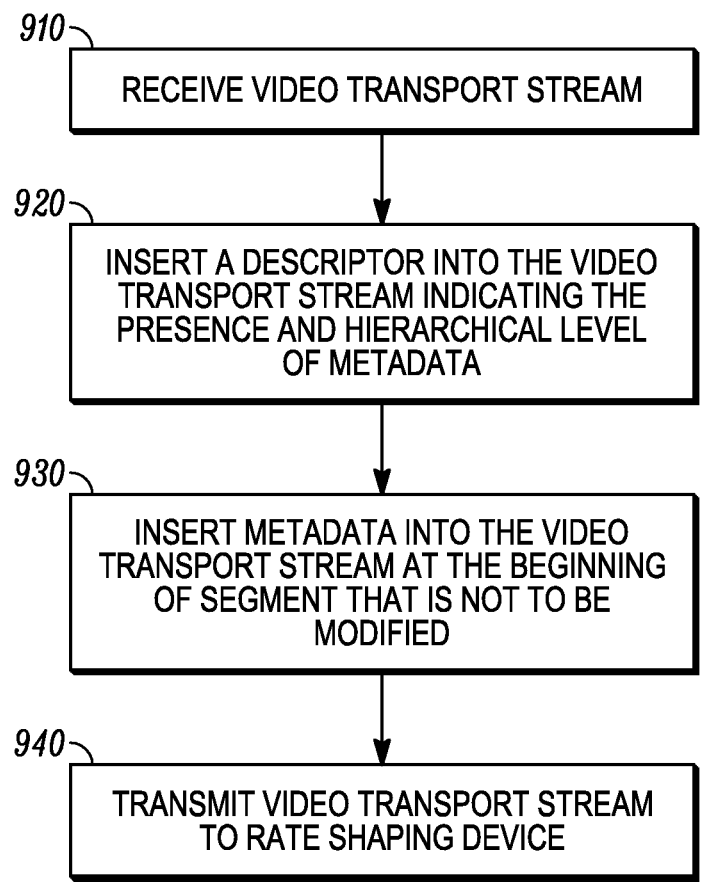
FIG. 9 is a flowchart illustrating one example of a method for processing a video transport stream.

FIG. 9 is a flowchart illustrating one example of a method for processing a video transport stream. The method begins in step 910 when a video transport stream is received. A descriptor is inserted into the PMT of the program in step 920 indicating the presence of private metadata and the hierarchal level at which the private metadata is placed (e.g., transport packet adaptation field, PES private data, or private picture data). In step 930 the private metadata is inserted into the video transport stream at the beginning of segments that are not to be modified. The video transport stream is transmitted over a communication channel to the downstream rate shaping device in step 940.

The processes described above, including but not limited to those performed by the rate shaping device shown in FIG. 7 and the transmitter shown in FIG. 8, may be implemented in a general, multi-purpose or single purpose processor. Such a processor will execute instructions, either at the assembly, compiled or machine-level, to perform that process. Those instructions can be written by one of ordinary skill in the art following the description herein and stored or transmitted on a computer readable medium. The instructions may also be created using source code or any other known computer-aided design tool. A computer readable medium may be any physical storage medium capable of carrying those instructions and include a CD-ROM, DVD, magnetic or other optical disc, tape, and silicon memory (e.g., removable, non-removable, volatile or non-volatile).

Although various embodiments are specifically illustrated and described herein, it will be appreciated that modifications and variations of the present invention are covered by the above teachings and are within the purview of the appended claims without departing from the spirit and intended scope of the invention.

The invention claimed is:

1. A method of multiplexing encoded video streams, the method comprising:
receiving, at a statistical multiplexer, a plurality of encoded video streams to be multiplexed into a transport stream;
extracting descriptor information indicating where predefined metadata is embedded in at least one of the plurality of encoded video streams, wherein the predefined metadata identifies one or more macroblocks defining a subset of at least one frame in the plurality of encoded video streams with an encoding that is to be preserved during statistical remultiplexing when decoding and re-encoding the received encoded video streams;
identifying the one or more macroblocks in the plurality of encoded video streams with the encoding that is to be preserved during statistical remultiplexing; and
preserving the encoding of the one or more identified macroblocks that define a subset of at least one frame when multiplexing the plurality of encoded video streams into the transport stream to preserve a portion of an image during the statistical remultiplexing.

2. The method of claim 1 wherein an indicator is inserted that identifies predefined metadata in the video transport stream which specifies the at least one portion of the video transport stream that is not to be re-encoded.

3. The method of claim 1 wherein the predefined metadata is incorporated into the video transport stream at a transport stream level, a video picture level, or a video sequence level.

4. The method of claim 1 wherein the descriptor is in the video transport stream and indicates the presence and location of the metadata.

5. The method of claim 4 wherein the descriptor is located in a program map table (PMT) associated with the video transport stream.

6. The method of claim 5 wherein the descriptor is a program descriptor.

7. The method of claim 5 wherein the descriptor is located in the elementary stream (ES) loop of the PMT.

8. The method of claim 2 wherein the predefined metadata is located in an adaptation field of transport packets in the video transport stream.

9. The method of claim 8 wherein the predefined metadata is located in an optional field of the adaptation field.

10. A rate shaping device, comprising:
a metadata extractor that extracts predefined metadata from a video transport stream, wherein the predefined metadata specifies at least one macroblock defining a subset of a frame in the video transport stream that is not to be altered during statistical remultiplexing;
a decoder that converts the video transport stream into original macroblock coefficients;
a quantizer arrangement that re-quantizes the macroblock coefficients at a quantization level different from their original quantization level;
a macroblock selector that receives the original macroblock coefficients from the decoder and the re-quantized macroblock coefficients from the quantizer arrangement;
a macroblock detector that receives a signal from the metadata extractor indicating the at least one macroblock defining the subset of the frame that is not to be altered during statistical remultiplexing, and compares the received signal with a current macroblock being processed; and
a macroblock selector that:
receives the original macroblock coefficients from the decoder and the re-quantized macroblock coefficients from the quantizer arrangement, and
selects, for each macroblock defining the subset of the frame in the video transport stream, either the corresponding original macroblock coefficient or the re-quantized macroblock coefficient based on the comparison of the macroblock detector.

11. The rate shaping device of claim 9 wherein the metadata extractor extracts the predefined metadata from the video transport stream at a transport stream level, a packetized elementary stream level, or a video sequence level.

12. The rate shaping device of claim 9 wherein the metadata extractor extracts a descriptor from the video transport stream indicating the presence and location of the predefined metadata.

13. The rate shaping device of claim 12 wherein the descriptor is extracted by the metadata extractor from a program map table (PMT) associated with the video transport stream.

14. The rate shaping device of claim 13 wherein the descriptor is located in the elementary stream (ES) loop of the PMT.

15. The rate shaping device of claim 13 wherein the descriptor is a program descriptor.

16. The rate shaping device of claim 9 wherein the metadata extractor extracts the predefined metadata from an adaptation field of transport packets in the video transport stream.

17. The rate shaping device of claim 16 wherein the predefined metadata is located in an optional field of the adaptation field.

18. A video transmitter, comprising:
   an A/V codec for receiving video programming and generating a digital video stream;
   a PSI module configured to receive private metadata associated with the video programming, generate at least one PSI table and insert a descriptor in the PSI table indicating the presence of the private metadata, wherein the private metadata identifies one or more macroblocks defining a subset of at least one frame in a plurality of encoded video streams, to be multiplexed into a transport stream, with an encoding that is to be preserved when re-encoding the encoded video streams during statistical remultiplexing; and
   a metadata insertion module configured to receive the digital video stream and the private metadata and insert the private metadata into a prescribed portion of the digital video stream specifying the one or more identified macroblocks that define a subset of at least one frame for which, when remultiplexing the plurality of encoded video streams into the transport stream, the encoding of the corresponding portion of an image should be preserved.

19. The video transmitter of claim 18 wherein the metadata inserter is configured to insert the private metadata into an adaptation field of the digital video stream.

20. At least one non-transitory computer-readable medium encoded with instructions which, when executed by a processor, performs a method including:
   extracting descriptor information indicating where predefined metadata is embedded in at least one of the plurality of encoded video streams, wherein the predefined metadata identifies one or more macroblocks defining a subset of at least one frame in the plurality of encoded video streams with an encoding that is to be preserved when re-encoding the encoded video streams during statistical remultiplexing;
   identifying the one or more macroblocks in the plurality of encoded video streams with the encoding that is to be preserved during statistical remultiplexing; and
   preserving the encoding of the one or more identified macroblocks that define a subset of at least one frame when multiplexing the plurality of encoded video streams into the transport stream to preserve a portion of an image during the statistical remultiplexing.

21. The non-transitory computer-readable medium of claim 20 wherein an indicator is inserted that identifies predefined metadata in the video transport stream which specifies the at least one portion of the video transport stream that is not to be re-encoded.

22. The non-transitory computer-readable medium of claim 20 wherein the predefined metadata is incorporated into the video transport stream at a transport stream level, a video picture level, or a video sequence level.

23. The non-transitory computer-readable medium of claim 20 wherein the descriptor is in the video transport stream and indicates the presence and location of the metadata.

24. The non-transitory computer-readable medium of claim 23 wherein the descriptor is located in a program map table (PMT) associated with the video transport stream.

* * * * *